(12) United States Patent
Dugas et al.

(10) Patent No.: US 11,263,837 B2
(45) Date of Patent: Mar. 1, 2022

(54) AUTOMATIC REAL-TIME DETECTION OF VEHICULAR INCIDENTS

(71) Applicant: Element AI Inc., Montreal (CA)

(72) Inventors: Charles Patrick Dugas, Montreal (CA); Robert John Riverso, Montreal (CA); Carlos Benfeito, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 184 days.

(21) Appl. No.: 16/576,050

(22) Filed: Sep. 19, 2019

(65) Prior Publication Data

US 2020/0098206 A1    Mar. 26, 2020

Related U.S. Application Data

(60) Provisional application No. 62/734,525, filed on Sep. 21, 2018.

(51) Int. Cl.
| | |
|---|---|
| *G07C 5/08* | (2006.01) |
| *G07C 5/00* | (2006.01) |
| *B60R 21/01* | (2006.01) |
| *B60R 21/00* | (2006.01) |

(52) U.S. Cl.
CPC ............ *G07C 5/0841* (2013.01); *B60R 21/01* (2013.01); *G07C 5/008* (2013.01); *B60R 2021/0027* (2013.01)

(58) Field of Classification Search
USPC ....................................................... 701/32.2
See application file for complete search history.

(56) References Cited

U.S. PATENT DOCUMENTS

| | | | | |
|---|---|---|---|---|
| 9,972,054 | B1 * | 5/2018 | Konrardy | B60W 50/0205 |
| 2010/0131304 | A1 * | 5/2010 | Collopy | G06Q 30/0269 |
| | | | | 705/4 |
| 2014/0300739 | A1 * | 10/2014 | Mimar | G08B 21/06 |
| | | | | 348/148 |
| 2019/0077353 | A1 * | 3/2019 | Lopez | B60R 21/0132 |
| 2020/0098206 | A1 * | 3/2020 | Dugas | G07C 5/0816 |

OTHER PUBLICATIONS

Liu, M. et al., "Unsupervised Image-to-Image Translation Networks", Conference on Neural Information Processing Systems (NIPS 2017), Long Beach, CA, USA.

* cited by examiner

*Primary Examiner* — Tyler D Paige
(74) *Attorney, Agent, or Firm* — BCF LLP

(57) ABSTRACT

Systems and methods for automatically determining, in near real-time, whether a vehicular incident has occurred and for automatically assessing whether the driver of a specific vehicle contributed to that incident. Data related to a specific vehicle is gathered by at least one sensor. The data is then transmitted to a data processing unit, which uses an incident detection module to determine whether an incident occurred. The system may verify that conclusion by sending a message to the vehicle occupant(s). The system may also take actions in response to the incident. If an incident has occurred, the data processing unit can use the vehicle-related data, as well as external data, to assess the contribution of the vehicle's driver. The system may comprise one or more neural networks. The system may also comprise a database for storing the vehicle-related data.

9 Claims, 7 Drawing Sheets

AUTOMATIC REAL-TIME DETECTION OF VEHICULAR INCIDENTS

RELATED APPLICATIONS

This application is a US non provisional patent application which claims the benefit of U.S. provisional application No. 62/734,525 filed on Sep. 21, 2018.

TECHNICAL FIELD

The present invention relates to vehicle telematics. More specifically, the present invention relates to automatically detecting a vehicular incident and automatically assessing a driver's contribution to that incident.

BACKGROUND

In automobile insurance, vehicular incidents (also called 'accidents', 'crashes', or 'collisions') represent potential damage to people, vehicles, and other property (including, without limitation, owned objects, owned animals, and land). Thus, each incident represents potential cost to the insurer. The insurer has more control and oversight when incidents are reported or detected early. In particular, the period between the time of an incident and the time at which the insurer learns of that incident is often critical. Referred to as the "First Notice of Loss" period, delays of weeks, days, and even hours here can increase eventual costs. Without knowledge of the incident, an insurer cannot guide the resolution process, and the parties to the incident may take actions of which the insurer would not approve (costly rental cars, unverified mechanics, etc.).

Likewise, a lack of information about the incident and its impacts can hamper claims management. Often, people who have just been involved in an incident are not thinking clearly. They may be injured or in shock, or they may simply not remember the specific details that led up to the incident. As a result, important information about vehicle speeds, road conditions, exact positioning of vehicles, and road signals, among other things, may not be easily available. Although insurance agents can obtain much of this information from other sources, this process is often arduous. This leads to further delays, which in turn can increase costs.

Long reconstruction times can also delay and complicate the determination of fault—that is, the amount of responsibility the insured driver bears for the incident. Fault is generally related to the driver's behaviour leading up to, and sometimes during, an incident. As is well-known, the eventual cost of a claim depends on the proper assignment of fault. Therefore, early knowledge of the fault distribution could save both the insured and the insurer time and money.

Of course, systems for rapid incident detection may have uses and benefits in fields other than in insurance. In particular, such systems may be used to improve emergency service response times. For instance, occupants of a crashed vehicle may be too badly injured to call for an ambulance or fire truck. In such cases, if the crash occurred in a remote or isolated region with few passersby, critical medical attention may be delayed by hours or more. In other cases, the occupants of the vehicle may not be able to identify their locations clearly (for instance, on long stretches of rural highway), and may have difficulty communicating with human dispatchers. Automated systems that can automatically report detected incidents to emergency services, however, could resolve such problems and potentially save lives.

Thus, there is clearly a need for systems and methods that automatically detect vehicular incidents. Preferably, these systems and methods would also be able to assess the distribution of fault, and to communicate with emergency services. Additionally, these systems and methods preferably operate in real-time or near-real-time.

SUMMARY

The present invention provides systems and methods for automatically determining, in near real-time, whether a vehicular incident has occurred and for automatically assessing whether the driver of a specific vehicle contributed to that incident. Data related to a specific vehicle is gathered by at least one sensor. The data is then transmitted to a data processing unit, which uses an incident detection module to determine whether an incident occurred. The system may verify that conclusion by sending a message to the vehicle occupant(s). The system may also take actions in response to the incident. If an incident has occurred, the data processing unit can use the vehicle-related data, as well as external data, to assess the contribution of the vehicle's driver. The system may comprise one or more neural networks. The system may also comprise a database for storing the vehicle-related data.

In a first aspect, the present invention provides a method for determining whether an incident involving a specific vehicle has occurred, said method comprising the steps of:
(a) receiving, in near real-time, vehicle-related data from at least one sensor, wherein said at least one sensor collects data related to a condition or operation of said specific vehicle;
(b) performing an analysis of said vehicle-related data, said analysis being performed in near real-time; and
(c) based on said analysis, determining whether said incident has occurred,
wherein said method is performed in near real-time,
and wherein said incident involves a risk of damage to at least one of: said specific vehicle; other vehicles; people; and property.

In a second aspect, the present invention provides a method for determining a contribution of a driver of a specific vehicle to an incident in which said specific vehicle was involved, said method comprising the steps of:
(a) receiving, in near real-time, vehicle-related data from at least one sensor, wherein said at least one sensor collects data related to a condition or operation of said specific vehicle;
(b) performing an analysis of said vehicle-related data; and
(c) based on said analysis, determining said contribution of said driver,
wherein said incident involves a risk of damage to at least one of: said specific vehicle; other vehicles; people; and property.

In a third aspect, the present invention provides a method for automatically determining whether an incident involving a specific vehicle has occurred, and for automatically determining a contribution of a driver of said specific vehicle to said incident, said method comprising the steps of:
(a) receiving, in near real-time, vehicle-related data from at least one sensor, wherein said at least one sensor collects data related to a condition or operation of said specific vehicle;
(b) performing a first analysis of said vehicle-related data, said first analysis being performed in near real-time;
(c) based on said first analysis, determining whether said incident has occurred;

(d) when said incident is determined to have occurred in step (c), performing a second analysis of said vehicle-related data; and
(e) based on said second analysis, determining said contribution of said driver, wherein said incident involves a risk of damage to at least one of: said specific vehicle; other vehicles; people; and property.

In a fourth aspect, the present invention provides a system for automatically determining whether an incident involving a specific vehicle has occurred, said system comprising:
- at least one sensor for collecting vehicle-related data, wherein said at least one sensor collects data related to a condition or operation of said specific vehicle;
- a data processing unit for receiving said vehicle-related data from said at least one sensor and for performing an analysis of said vehicle-related data;
- an incident detection module, wherein said data processing unit uses said incident detection module for performing said analysis, and wherein said data processing unit thereby uses said incident detection module for determining, based on said analysis, whether said incident has occurred, wherein said vehicle-related data is received and analyzed in near real-time, and
wherein said incident involves a risk of damage to at least one of: said specific vehicle; other vehicles; people; and property.

In a fifth aspect, the present invention provides non-transitory computer-readable media having encoded thereon computer-readable and computer-executable instructions that, when executed, implement a method for determining whether an incident involving a specific vehicle has occurred, said method comprising the steps of:
(a) receiving, in near real-time, vehicle-related data from at least one sensor, wherein said at least one sensor collects data related to a condition or operation of said specific vehicle;
(b) performing an analysis of said vehicle-related data, said analysis being performed in near real-time; and
(c) based on said analysis, determining whether said incident has occurred, wherein said method is performed in near real-time,
and wherein said incident involves a risk of damage to at least one of: said specific vehicle; other vehicles; people; and property.

In a sixth aspect, the present invention provides non-transitory computer-readable media having encoded thereon computer-readable and computer-executable instructions that, when executed, implement a method for determining a contribution of a driver of a specific vehicle to an incident in which said specific vehicle was involved, said method comprising the steps of:
(a) receiving, in near real-time, vehicle-related data from at least one sensor, wherein said at least one sensor collects data related to a condition or operation of said specific vehicle;
(b) performing an analysis of said vehicle-related data; and
(c) based on said analysis, determining said contribution of said driver, wherein said incident involves a risk of damage to at least one of: said specific vehicle; other vehicles; people; and property In a seventh aspect, the present invention provides non-transitory computer-readable media having encoded thereon computer-readable and computer-executable instructions that, when executed, implement a method for automatically determining whether an incident involving a specific vehicle has occurred, and for automatically determining a contribution of a driver of said specific vehicle to said incident, said method comprising the steps of:
(a) receiving, in near real-time, vehicle-related data from at least one sensor, wherein said at least one sensor collects data related to a condition or operation of said specific vehicle;
(b) performing a first analysis of said vehicle-related data, said first analysis being performed in near real-time;
(c) based on said first analysis, determining whether said incident has occurred;
(d) when said incident is determined to have occurred in step (c), performing a second analysis of said vehicle-related data; and
(e) based on said second analysis, determining said contribution of said driver, wherein said incident involves a risk of damage to at least one of: said specific vehicle; other vehicles; people; and property.

BRIEF DESCRIPTION OF THE DRAWINGS

The present invention will now be described by reference to the following figures, in which identical reference numerals refer to identical elements and in which.

DETAILED DESCRIPTION

Figure 1:
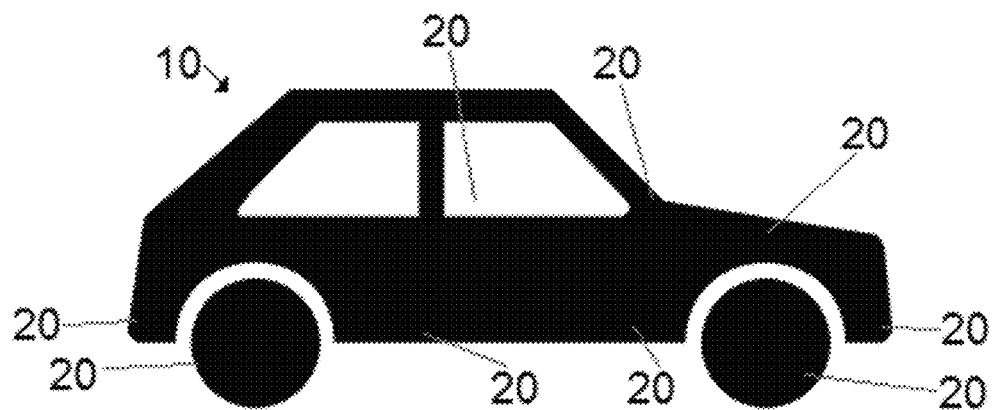
FIG. 1 is a diagram of a vehicle showing possible sensor locations.

The present invention provides systems and methods for automatic, near real-time detection of vehicular incidents, for automatic fault assessments related to those incidents, and for taking automatic and near real-time actions in response to those incidents. Referring first to FIG. 1, a diagram of a vehicle 10 is shown. This vehicle 10 is equipped with multiple sensors 20. Each of the sensors 20 collects data related to the condition or operation of the vehicle 10. As an example, one of the sensors 20 may collect data related to the structural integrity of the vehicle 10 (i.e., to the vehicle 10's condition), while another of the sensors 20 may collect data related to the vehicle 10's speed (i.e., to the vehicle 10's operation). Of course, some sensors may collect data that is related to both condition and operation. For instance, a sensor may collect engine temperature data.

The sensors 20 in FIG. 1 are shown in potential and exemplary locations on the vehicle 10. For example, FIG. 1 indicates potential placement of sensors on: the rear bumper;

a rear wheel; the vehicle's undercarriage; a front side door; a front wheel; the front bumper; 'under' the vehicle's hood (i.e., connected to the engine); on or within the vehicle's dashboard; and within the interior of the vehicle. These are only intended to indicate possible locations. Depending on the implementation, a vehicle 10 may have sensors 20 at any of these locations, or at none of these locations. As would be clear to the person of skill in the art, the sensors 20 may be in any location or configuration that allows them to collect the desired vehicle-related data.

In some cases, a sensor 20 may be coupled to the vehicle 10, either to its exterior or interior, and configured to monitor conditions external to the vehicle. As an example, such a sensor might include an 'exterior rear proximity sensor' to detect objects close to the vehicle's rear bumper. Other sensors 20 may be coupled to an internal component of the vehicle 10. For instance, a sensor may be directly coupled to a piston within the vehicle's engine. Such a sensor would collect piston-related data. As another alternative, data may be obtained from sensors on devices within the vehicle 10. For instance, acceleration data for the vehicle 10 could be obtained from an accelerometer on a mobile computing device belonging to an occupant of the vehicle 10. As another example, a sensor could be attached to or built into the driver's key fob. Such a sensor could be configured to collect data only when the engine of the vehicle 10 is active.

In a preferred implementation, every individual part and component of the vehicle 10 would be coupled to a separate sensor. This would allow significant amounts of data to be gathered and analyzed. However, any number of sensors 20 may be used. In some cases, there may only be a single sensor 20 used on a certain vehicle 10. For instance, data related to acceleration may be sufficient to detect an incident, as a vehicle that decelerates extremely rapidly has likely come to a sudden stop.

It should additionally be clear that the car shown in FIG. 1 is merely exemplary. The system of the present invention may be applied to any kind of land vehicle, including without limitation: sedans; hatchbacks; coupes; motorcycles; cargo vehicles; sport utility vehicles; recreational vehicles; inland marine vehicles; minivans; trucks of any kind; and buses.

Figure 2A:
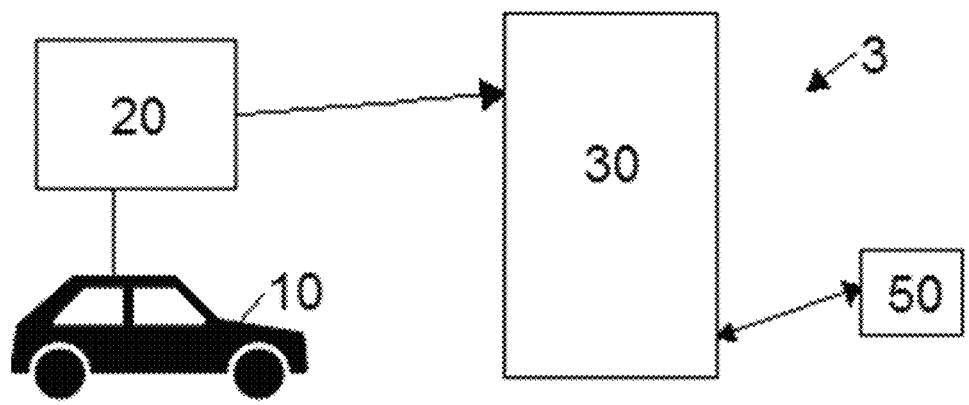
FIG. 2A is a block diagram of one embodiment of a system according to one aspect of the invention.

Referring now to FIG. 2A, a block diagram of a system 3 according to one aspect of the invention is illustrated. Sensors 20 collect data related to the vehicle 10 and transmit that vehicle-related data to a data processing unit 30. The data processing unit 30 performs an analysis of the vehicle-related data using an incident detection module 50. Based on that analysis, the data processing unit 30 determines whether an incident has occurred. In some embodiments, this determination may be a binary statement (e.g., 'incident has occurred'/'no incident has occurred'). In other embodiments, the determination may be a probability that an incident has occurred. In still other embodiments, moreover, the determination may be a binary statement that is based on a determined probability value. For instance, the system 3 may first determine a probability that a certain incident occurred, and then compare that probability to a threshold (e.g., 50%). If the probability that the certain incident occurred is higher than the threshold, the system would determine the 'incident has occurred' binary option.

As would be clear to the person skilled in the art, the data processing unit 30 may be implemented in many different forms. As examples, the data processing unit 30 may comprise: a server and one or more processors; a computing unit that resides on an off-site server; an in-vehicle computing unit; and/or systems that employ distributed computing methods, including the well-known 'cloud' (semi-centralized) and 'fog' (edge device) computing methods. Further, in multi-processor implementations, data may be processed by multiple processors in parallel. Additionally, different processors may process different portions of the data.

The sensors 20 may also process the vehicle-related data they gather, before transmitting that data to the data processing unit 30. This approach may be useful in some scenarios. For instance, large video files gathered by a dashboard camera could be compressed before being transmitted to the data processing unit 30. As another example, the sensors 20 may be configured to reduce noise in the vehicle-related data. Other such techniques that are well-known in the art of data processing and transmission may likewise be applied at the sensor side.

The vehicle-related data is transmitted through the system 3 in near real-time, and is also processed in near real-time. As is well known in the art, the term "near real-time" takes into account unavoidable time delays in real-time signals. These time delays are necessarily introduced by automated processing and by data transmission. In general, these time delays are insignificant and have little or no impact on the outcome of the process. The absolute real-time duration of these delays may vary depending on the implementation and the context.

The analysis performed by the data processing unit 30, using the incident detection module 50, may take many forms. The form of the analysis may depend on the type and volume of data received, on the sensors 20 used, on the specific vehicle being analyzed, and on the user's preferences. Referring to the example above, if the data processing unit 30 receives a single stream of acceleration data, the incident detection module 50 may be configured to recognize rapid decelerations only. In this example, the incident detection module 50 may compare each deceleration to a threshold value that indicates the amount of time in which a normal (i.e., non-incident) deceleration would occur. If the length of time for a given deceleration in the data stream is smaller than that threshold value, the incident detection module 50 would report an incident. The threshold value can be a predetermined number.

However, as mentioned above, it is preferable to have multiple streams and sources of data related to the specific vehicle. In fact, it is preferable to have as many data sources as possible. As a result, predetermined values for each possible incident marker would be time-consuming and often difficult to determine. Thus, in a preferred implementation, the data processing unit 30 uses the incident detection module 50 to compare the specific vehicle's data to historical operation data. This historical operation data may comprise data from the specific vehicle itself and from other similar vehicles. Additionally, the historical operation data may comprise data gathered while the specific vehicle or similar vehicles were in normal operating conditions, and, if available, data gathered during and after previous known incidents involving these vehicles. Such comparisons would allow the incident detection module 50 to determine more accurately whether the specific vehicle is operating in normal conditions or in incident conditions, and thus to determine the probability that an incident has occurred.

In one implementation of this comparison analysis, the incident detection module 50 comprises a neural network that has been trained on historical operation data. As would be clear to the person skilled in the art, the training set of historical operation data could include data from many different vehicles and kinds of vehicles, in normal operating conditions and in incident conditions. The neural network would be trained, based on this training data, to automatically identify data patterns in the specific vehicle's data that suggest the occurrence of an incident.

In another implementation of the comparison analysis, the incident detection module 50 may be a rules-based module. In this implementation, the incident detection module is connected to a database or other data store that contains the historical operation data. Such an implementation may be preferred over the neural network implementation, described above, by some users for some purposes. However, the neural network implementation is generally preferable.

Figure 2B:
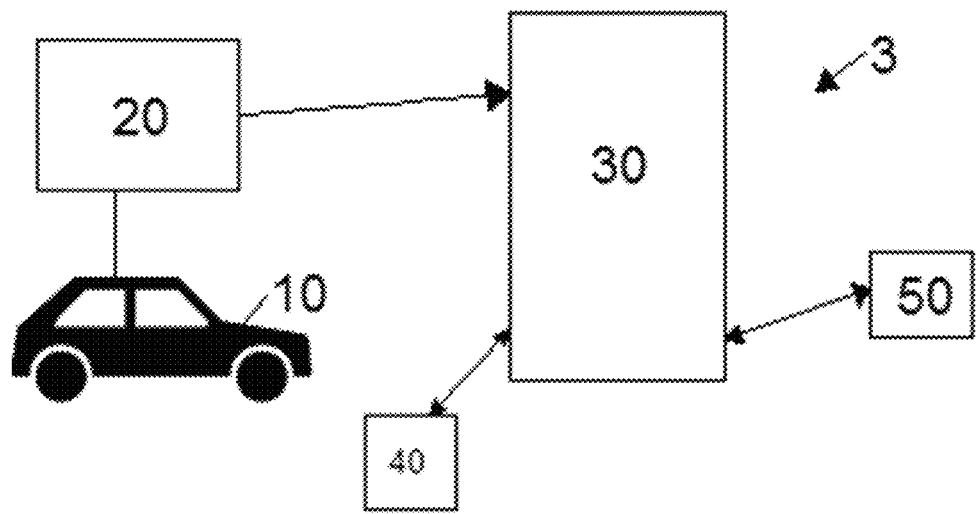
FIG. 2B is a block diagram of another embodiment of a system according to one aspect of the invention.

FIG. 2B is a block diagram showing another embodiment of the system 3. In this implementation, the vehicle-related data is stored in a database 40 before being processed by the data processing unit 30. Data may, of course, also be stored after being processed by the data processing unit 30. For instance, the outcome of a certain data pattern might be stored with that data pattern, and be used as the basis for later analysis. That is, if the incident detection module 50 determined that a certain data pattern indicated an incident, that determination could be stored in the database and related to that data pattern, for future reference. Additionally, in an implementation wherein the incident detection module 50 comprises a neural network, this stored data may be used as the basis for a training set for use in training later versions of the neural network model. An embodiment of the invention that uses such a database 40 may thus be preferable for some uses.

Figure 3:
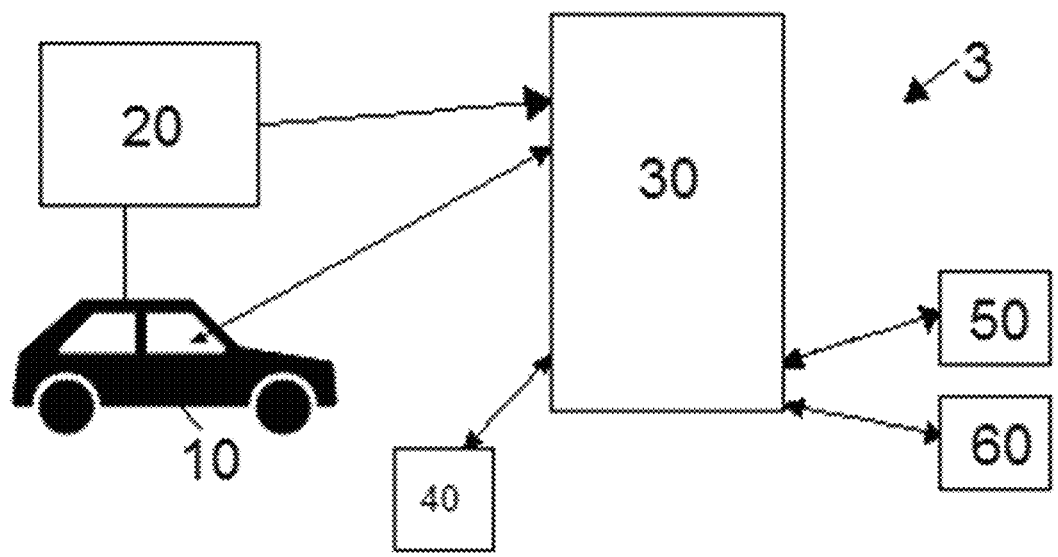
FIG. 3 is a block diagram of another embodiment of the system of FIG. 2.

Referring now to FIG. 3, another embodiment of the system 3 is illustrated. This embodiment is very similar to the embodiment shown in FIG. 2B. Vehicle-related data is gathered by the sensors 20 and transmitted to the data processing unit 30. The vehicle-related data is stored in the database 40. The data processing unit 30 uses the incident detection module 50 to perform an analysis of that data, and, based on that analysis, the incident detection module 50 determines whether an incident has occurred. Unlike in FIG. 2B, however, the system 3 in FIG. 3 includes a verification module 60. This verification module 60 allows the system 3 to verify whether the incident has in fact occurred. That is, when the incident detection module 50 detects an incident, the verification module 60 will take steps to verify that the incident has occurred. In some implementations, these steps may include directing the data processing unit 30 to cause a message to be sent to at least one occupant of the specific vehicle 10. Such a message may be sent to the vehicle 10 itself and may be displayed on a connected display within the vehicle. As an alternative, this message may be sent to a personal mobile device belonging to one or more current occupants of the vehicle 10. The message will ask the vehicle occupant(s) to confirm whether the detected incident actually occurred. Based on the response received, and on the data already gathered, the system may then take a suitable course of action.

There are many possible actions that the system 3 may take after receiving a response to an incident verification message. These include, without limitation: actions to mitigate or address possible injuries to people; actions to mitigate or address possible damage to vehicles; and insurance-related actions. Additionally, the system 3 can take multiple actions in response to a single incident.

As an example, if the occupant(s) confirm that an incident has occurred, and the data gathered suggest that the incident severely damaged the vehicle (for instance, if all sensors in the front wheels, front axle, and transmission are no longer transmitting data/are not responsive), the system 3 can connect with an external system to request a tow truck to the vehicle's location. As another example, the system 3 could alert a mechanic and/or a car rental agency. As yet another example, the system 3 could alert emergency services (e.g., police services, fire services, and/or ambulance services). For instance, if sensors in the vehicle's doors indicate that the doors will no longer open, the system 3 may request a fire truck. Likewise, if data gathered suggest that the occupant(s) are likely to be badly injured (e.g., if the airbags deployed, the steering column collapsed, and the structural integrity of the dashboard and engine region appears compromised), the system 3 can call for an ambulance.

Before requesting an ambulance or taking other actions, in some implementations, the data processing unit 30 may send a secondary message to the occupant(s) of the vehicle 10. This secondary message would ask the occupant(s) to confirm whether an ambulance or other emergency service vehicle is needed or desired. As mentioned above, such a message may not always be necessary, if the data gathered is already highly suggestive of injury. However, if the data gathered is less robust (e.g., the single stream of acceleration data), it may be preferable to request confirmation before requesting dispatch of emergency vehicles.

On the other hand, there may be scenarios in which the occupant(s) are too badly injured to respond to either the initial "has there been an incident?" message or to any secondary confirmation messages. Thus, it is preferred that a response timer be built into the verification module: that is, if there is no response to the initial incident verification message within a short period of time, an ambulance would be automatically requested. This short period of time could vary depending on the implementation, but preferably would not exceed a few minutes.

As another alternative, the system 3 may have incorrectly detected an incident (i.e., detected a 'false positive' result). In such a case, the occupant(s) of the vehicle would respond in the negative to the initial incident verification message. The system 3 could then take that response as feedback. In an implementation in which the incident detection module 50 comprises a neural network, that response could be used in a new training set, along with the data patterns detected. Thus, the neural network could learn that the data patterns detected did not indicate an incident, and use that fact in later assessments. Similarly, if the incident detection module 50 is a rules-based module, the rules could be adapted to prevent future false positives based on similar patterns.

Figure 4:
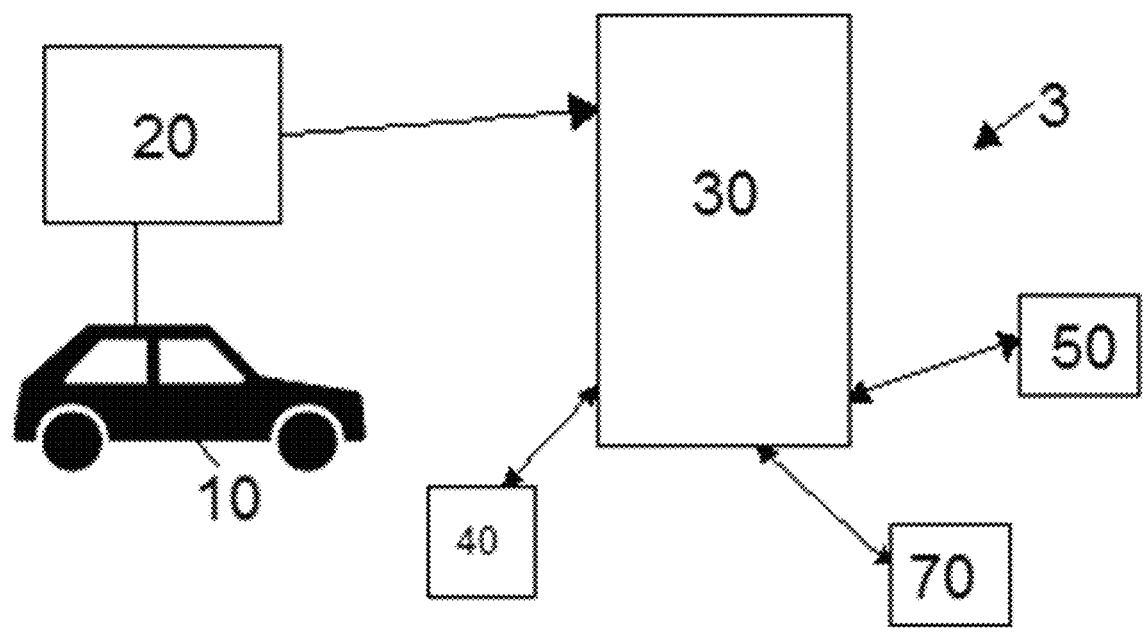
FIG. 4 is a block diagram of another embodiment of the system of FIG. 2.

Referring now to FIG. 4, another embodiment of the system 3 is illustrated. This embodiment is, again, quite similar to that in FIG. 2B. However, in FIG. 4, after the data processing unit 30 uses the incident detection module 50 to determine whether an incident has occurred, the data processing unit 30 uses a contribution module 70 to make an initial assessment of fault—that is, to determine the contribution of the driver of the vehicle 10 to the incident. Using the contribution module 70, the data processing unit 30 analyses the vehicle-related data received from the sensors 20 via the data processing unit 30. Based on that analysis, the contribution module 70 can then determine the driver's contribution to the incident (i.e., the responsibility or the fault that the driver bears for the incident).

Again, it is preferable to have as much vehicle-related data as possible when determining fault. There may be cases where a single data stream or source is enough for an initial assessment: for instance, if a vehicle 10 travelling at, say, 210 km/h is involved in an incident, the driver of that vehicle is likely to bear a significant portion of the responsibility for that incident. However, in most cases, a single piece, stream, or source of data may be insufficient to reasonably assess fault.

Figure 5:
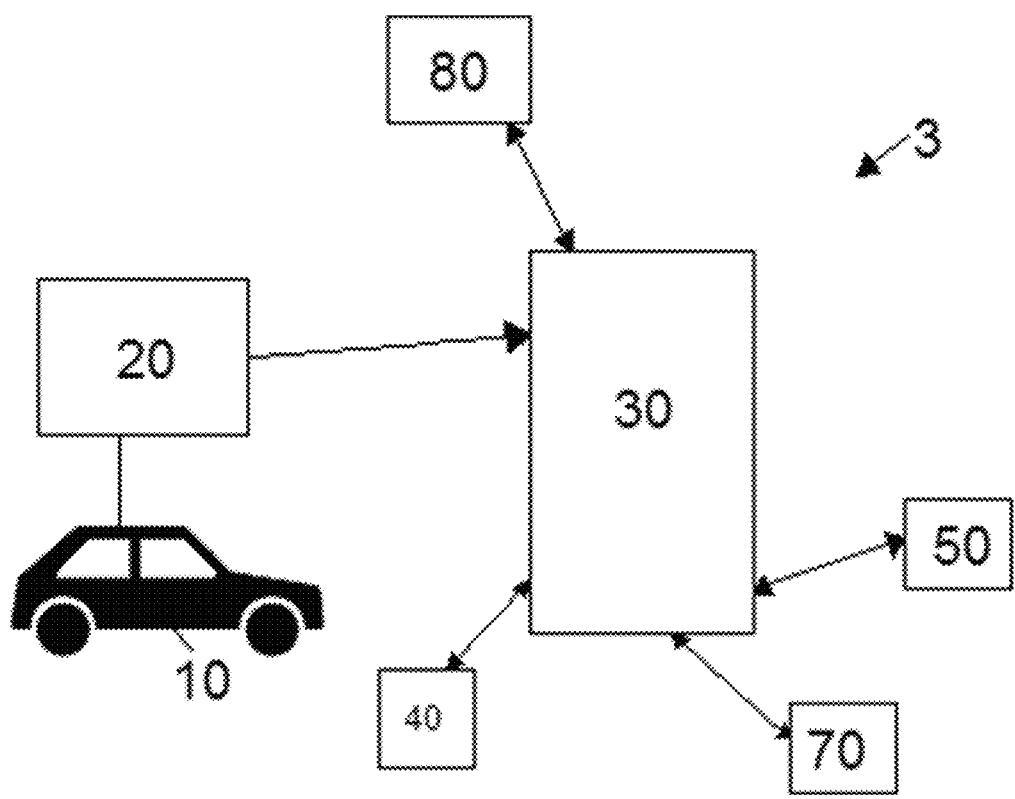
FIG. 5 is a block diagram of another embodiment of the system of FIG. 2.

Furthermore, reasonable fault assessment may require more than simply vehicle-related data. That is, it may not be possible to analyse what happened leading up to and during an incident based solely on data related to the specific vehicle 10. FIG. 5 thus shows an embodiment of the system 3 in which the data processing unit 30 receives external data from at least one external source 80. This external data is not related to the condition or operation of the vehicle 10. As an example, external data may comprise information on weather and/or road conditions that might alter the fault assessment. For instance, a reasonable speed in good visibility on clear roads may be far too fast on icy or wet roads, or in conditions of poor visibility. Thus, the speed value alone may not be sufficient to determine whether the driver's actions (i.e., driving at that speed) contributed to the incident. In such a case, external data would be needed for a reasonable assessment. Similarly, video data from external sources (such as highway traffic cameras) could show that a vehicle other than the specific vehicle 10 was primarily responsible for the incident. This information could not be obtained simply by looking at data related to the vehicle 10. Depending on the complexity of the external data, then, fault assessments may take longer than near real-time processing.

Again, the analysis performed using the contribution module 70 may take many forms, depending on the data received. In one approach, the contribution module 70 develops a machine-based simulation of the incident and analyses that simulation. This simulation is generally a mathematical simulation from which video and/or image simulations can be created. These videos and images may be useful for human understanding of the eventual fault assessment. However, the contribution module 70 itself would not necessarily require such visual aids to determine the distribution of fault.

Rather, the contribution module 70 could use the incident simulation to predict data regarding the incident. Then, to determine the distribution of fault, the contribution module 70 could compare that data to data generated from simulations of other, known incidents. Each known incident would be associated with a known fault assessment. Based on the comparison of predicted data, then, the contribution module 70 could determine an appropriate fault assessment for the current incident.

In some implementations, the contribution module 70 is a rules-based module. This rules-based module is connected to a data store containing data and fault assessments for known incidents. Such an implementation may be preferred in some cases. However, it is generally preferable that the contribution module 70 comprises at least one neural network. In a preferred implementation, further, the contribution module 70 comprises three separate neural networks. One of these neural networks is configured and trained to produce an incident simulation based both on vehicle-related data and on external data. Another neural network has been trained to predict data regarding an incident, based on a simulation of that incident. The third neural network, then, would be trained to compare that predicted data to data from other, known incidents and determine an appropriate fault distribution. In other implementations, of course, as would be clear to the person skilled in the art, these three functions could be performed by a single neural network, or by two networks, or subdivided into smaller tasks and each task assigned to a separate network.

Figure 6:
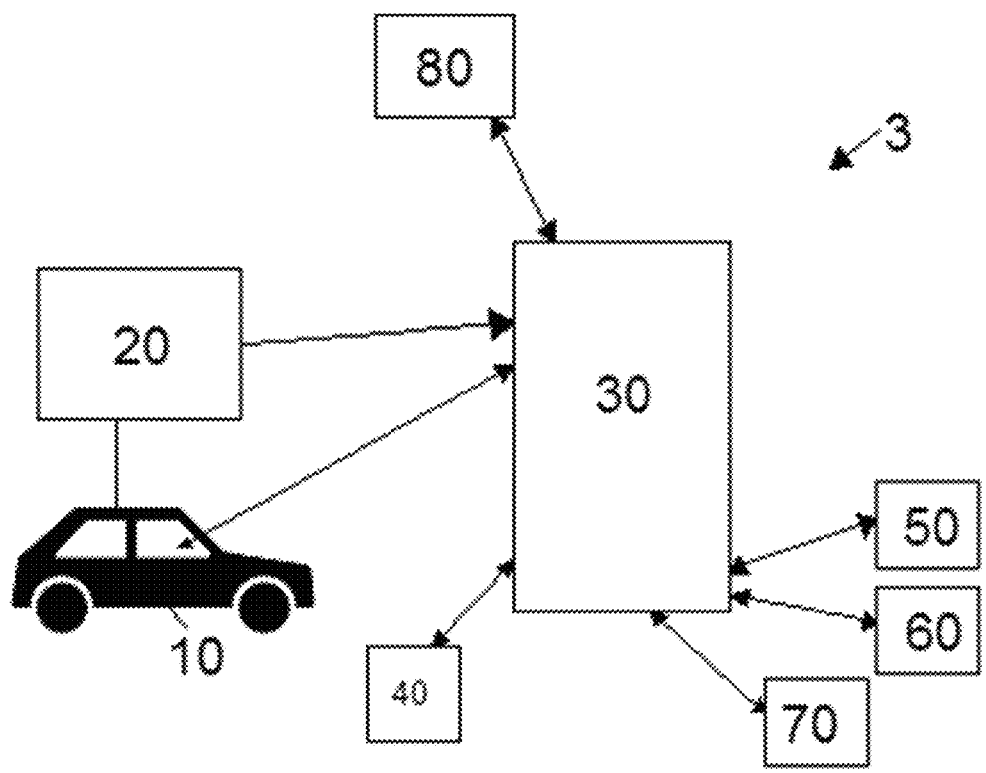
FIG. 6 is a block diagram of another embodiment of the system of FIG. 2.

FIG. 6 shows another embodiment of the system 3. This embodiment includes all the various features discussed above. Sensors 20 gather data related to a specific vehicle 10 and transmit that data to the data processing unit 30 in near real-time. The data processing unit 30 also receives external data from at least one external data source 80. The data processing unit 30 passes the vehicle-related data and the external data to the data processing unit 30, again in near real-time. The data processing unit 30 uses the incident detection module 50 to determine, in near real-time, whether an incident has occurred, based on the vehicle-related data. If the incident detection module 50 determines that an incident has in fact occurred, the verification module 60 directs the data processing unit 30 to send a message to the occupant(s) of the vehicle 10. The system 3 can then take a suitable course of action based on a response (or lack of response) to that message. Secondary confirmation messages can also be sent. The data processing unit 30 then uses the external data and the vehicle-related data to determine the contribution of the vehicle 10's driver to the incident.

Figure 7:
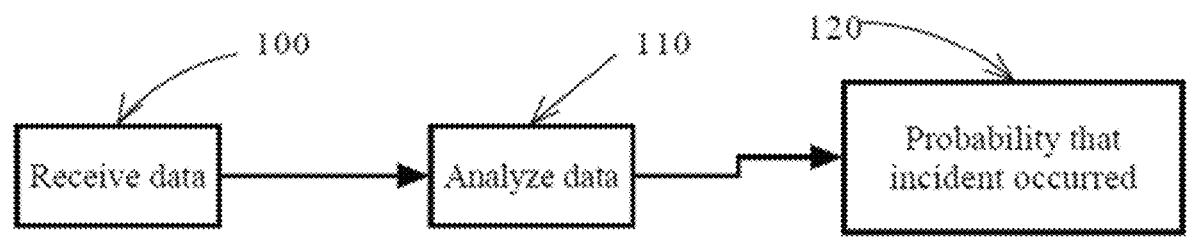
FIG. 7 is a flowchart detailing a method according to one aspect of the invention.

Referring to FIG. 7, a flowchart detailing one method according to one aspect of the present invention is illustrated. In FIG. 7, the method begins by receiving vehicle related data (step 100). This vehicle-related data is then analyzed (step 110) and, based on that analysis, a probability that an incident has or has not occurred is generated (step 120). Of course, the result of step 120 may be binary, i.e., 'has an incident occurred' or 'has an incident not occurred'. This may be based on a probability generated using the data analysis. A threshold probability may be used so that, if the probability is above a certain value, then a conclusion that the incident has occurred is made. However, if the probability is below the threshold, then the conclusion that the incident has not occurred is made.

Figure 8:
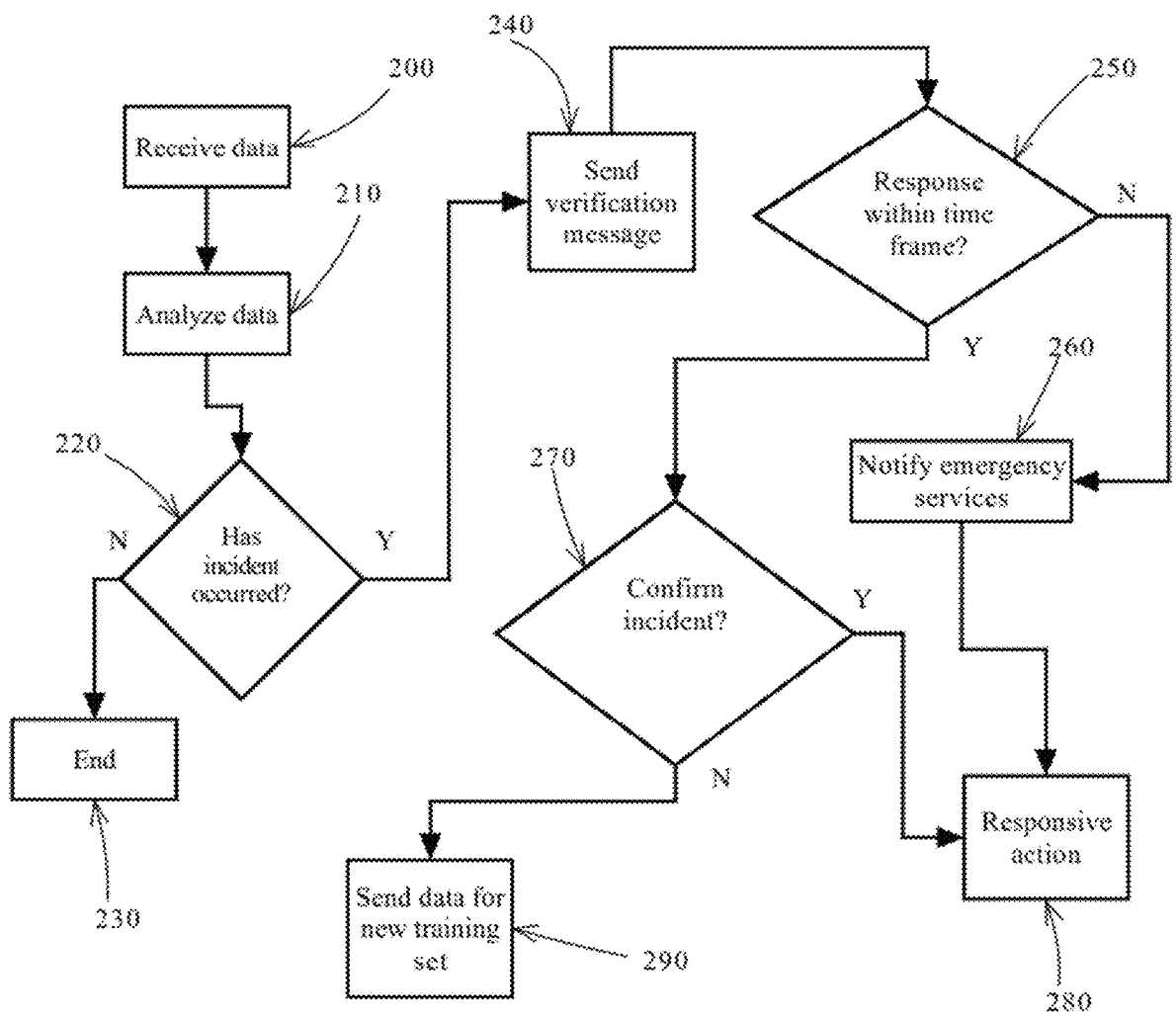
FIG. 8 is a flowchart detailing a more detailed embodiment of the method illustrated in FIG. 7.

Referring to FIG. 8, a flowchart of another method according to another aspect of the present invention is illustrated. In this method, detailed are the steps for determining whether an incident has occurred and what steps are taken after that determination is made. The method begins at step 200, that of receiving vehicle-related data. This data is then analyzed (step 210). Based on the analysis, a determination (step 220) is made as to whether an incident has occurred. As noted above, the determination may result in a probability that an incident has occurred and, if the probability is above or below a given threshold, a conclusion about the occurrence of the incident is made. If it is concluded that an incident has not occurred, then the method ends (step 230). On the other hand, if the analysis of the data indicates that an incident has occurred, then the system causes a verification message to be sent to one or more occupants of the vehicle (step 240).

Continuing from the above, decision 250 determines if a response to the verification message has been received within a predetermined amount of time. To ensure ease of responding to the verification message, a message with two radio buttons may be sent to the occupant(s). In such an implementation, the radio buttons would simply indicate 'YES, an incident has occurred' and 'NO, an incident has not occurred'. The user would simply need to click one or the other to respond to the message. In other implementations, depending on the vehicle's configuration, natural user interfaces such as audio messages and voice recognition systems may be used. In still other implementations, visual driver monitoring interfaces may be used to communicate with the vehicle's occupant(s). If no response has been received within the allotted time frame, the system assumes that an incident has occurred and the occupants of the vehicle are unable to respond. The system thus automatically contacts emergency services (e.g., the police department, the fire department, emergency medical services, etc.) to cause emergency vehicles and support personnel to be dispatched to the last known location of the vehicle, which may in some cases be the vehicle's current location (step 260). Alternatively, if a response has been received within the allotted time frame, then decision 270 determines if the response is a confirmation of the occurrence of an incident. If the response indicates that an incident has occurred, then suitable actions responsive to the incident are executed (step 280). These actions may also be executed after step 260—i.e., after emergency services have been notified, responsive actions are executed. The responsive actions may include contacting relevant emergency services, contacting the occupants' emergency contacts, and initiating insurance-related actions such as opening an incident report/opening an insurance claim file. Of course, if the response to the verification message has been received and it indicates that an incident has not occurred, then a false positive has been encountered. The vehicle-related data surrounding the false positive and any other relevant data can then be saved/stored in a database or transmitted to a server for use in later versions of the system (step 290). In a machine learning implementation, this false positive data may be retained for use in a training set that would be used to train a later version of the machine learning model.

Figure 9:
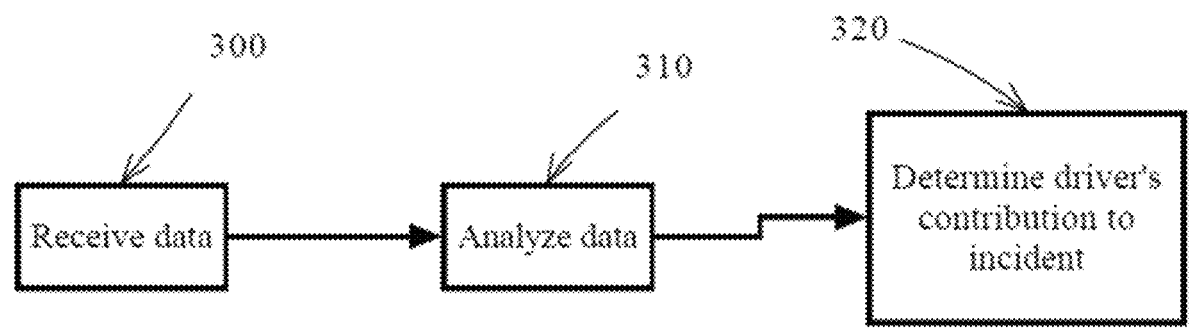
FIG. 9 is a flowchart detailing a method according to another aspect of the invention.

Referring to FIG. 9, a flowchart detailing the steps in another method according to another aspect of the present invention is illustrated. In this method, the driver's contribution to the occurrence of an incident is automatically determined. The method begins at step 300, that of receiving data. This data is then analyzed in step 310. Based on the analysis, the driver's contribution to the incident is determined in step 320. It should be clear that the data referred to in the method may be vehicle-related data or data external to the vehicle or a combination of the two. As an example, vehicle-related data may include the vehicle's velocity at the time of the incident, the vehicle's running condition, etc., etc. External data may include the weather conditions, visibility, and traffic conditions at the time of the incident. Based on either vehicle-related data or external data, or based on a combination of these types of data, the driver's contribution to the incident may be determined automatically.

It should be clear that the driver's contribution may be a percentage in conjunction with a probability value. Thus, a driver may have a 40% contribution to an incident and this 40% contribution may be determined to be have a probability of 80% (i.e., there is an 80% probability that the driver had a 40% contribution to the incident). As well, it should be clear that the analysis of the vehicle-related data and of the external data may be implementation-dependent and situation-dependent. It should also be clear that the method in FIG. 9 may be combined with the method in FIG. 8 to result in a larger method implemented by a system to first determine whether an incident has occurred and then, if an incident has occurred, to automatically determine the driver's contribution to the occurrence of the incident. It should also be clear that the determination of the driver's contribution to the incident may be performed concurrently or sequentially with the steps in the method of FIG. 8. Thus, while the system may be contacting emergency services, the system is also gathering vehicle-related data and external data to determine the driver's contribution to the incident.

For clarity, the present invention has a number of different aspects. One aspect involves a system for automatically determining whether an incident involving a specific vehicle has occurred. Such a system may comprise at least one sensor for collecting vehicle-related data (wherein the at least one sensor collects data related to a condition or operation of the specific vehicle), a data processing unit for receiving the vehicle-related data from the at least one sensor and for performing an analysis of said vehicle-related data, and an incident detection module. In such a system, the data processing unit uses the incident detection module for performing the analysis, and the data processing unit thereby uses the incident detection module for determining, based on said analysis, whether the incident has occurred. Also, in such a system, the vehicle-related data is received and analyzed in near real-time and the incident involves a risk of damage to at least one of: the specific vehicle, other vehicles, people, and property.

For such a system, the at least one sensor may be at least one of: a sensor configured to monitor external conditions of the specific vehicle; a sensor coupled to an internal component of the specific vehicle; and a sensor on a device within the specific vehicle. The system may also include a database for storing the vehicle-related data and results of said analysis. As well, the system may include a verification module for verifying whether the incident has occurred, with the data processing unit causing a message to be sent to an occupant of the specific vehicle based on a direction from the verification module.

Note that the system may include a contribution module for determining a contribution of a driver of the specific vehicle to said incident. This contribution module may use the vehicle-related data in determining the contribution. Additionally, the contribution module may also use external data, with the external data being from a data source unrelated to a condition or operation of the specific vehicle.

For the incident detection module, it may use a neural network. As well, the contribution module may also comprise a neural network.

It should be clear that the various method aspects of the present invention may take the form of non-transitory computer-readable media having encoded thereon computer-readable and computer-executable instructions that, when executed, implement one or more of the various methods of the present invention.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for determining a contribution of a driver of a vehicle to an incident involving the vehicle, the method comprising:
    receiving, in near real-time, vehicle-related data from a plurality of sensors attached to the vehicle, wherein the plurality of sensors collect data related to a condition or operation of the vehicle;
    inputting at least a portion of the vehicle-related data to a first neural network configured to generate a simulation of the incident;
    outputting, by the first neural network, the simulation of the incident;
    generating, by a second neural network and based on the simulation of the incident, predicted data regarding the incident;
    comparing, by a third neural network, the predicted data to data from known incidents; and
    outputting, by the third neural network, a fault distribution corresponding to the incident.

2. The method according to claim 1, wherein the plurality of sensors comprises at least one of:
    a sensor coupled to the vehicle and configured to monitor conditions external to the vehicle;
    a sensor coupled to an internal component of the vehicle; and
    a sensor on a device within the vehicle.

3. The method according to claim 1, wherein the data from known incidents comprises
    data from vehicles similar to the vehicle, gathered from said vehicles while operating under known incident conditions.

4. The method according to claim 1, further comprising determining a probability that the incident has occurred, based on the vehicle-related data.

5. The method according to claim 1, further comprising predicting a level of injury to occupants of the vehicle, said prediction being based on the vehicle-related data.

6. The method of claim 1, further comprising verifying that the incident has occurred, said verifying comprising:
    outputting a message to at least one occupant of the vehicle; and
    analyzing a response to the message.

7. The method according to claim 6, further comprising taking at least one action based on the response and the vehicle-related data, wherein the at least one action comprises at least one of:
    an action to mitigate or address possible injuries to occupants of the vehicle;
    an action to mitigate or address possible injuries to other people;
    an action to mitigate or address possible damage to the vehicle; and
    an insurance-related action.

8. The method according to claim 1, wherein the vehicle-related data comprises a velocity of the vehicle.

9. The method according to claim 1, wherein the vehicle-related data comprises an indication of weather conditions affecting the vehicle, an indication of traffic conditions affecting the vehicle, and an indication of visibility corresponding to the vehicle.

* * * * *